Aug. 15, 1961  M. CRAIN  2,995,907
UNIVERSAL FLEXIBLE COUPLING
Filed March 9, 1960  2 Sheets-Sheet 1

Inventor: Michel Crain
BY Baldwin & Wight
attorneys

Aug. 15, 1961 M. ORAIN 2,995,907
UNIVERSAL FLEXIBLE COUPLING
Filed March 9, 1960 2 Sheets-Sheet 2

Inventor: Michel Orain
BY Baldwin & Wight
attorneys

United States Patent Office 2,995,907
Patented Aug. 15, 1961

2,995,907
UNIVERSAL FLEXIBLE COUPLING
Michel Orain, Nanterre, France, assignor to Societe Glaenzer Spicer Societe Anonyme, Poissy, France, a corporation of France
Filed Mar. 9, 1960, Ser. No. 13,821
Claims priority, application France Mar. 13, 1959
15 Claims. (Cl. 64—11)

This invention relates to universal flexible couplings of the type used in transmitting torque between a pair of rotatable shafts which may assume a certain amount of angular misalignment with respect to each other which misalignment may be deliberate or accidental.

Various types of such universal flexible couplings are known; most of them utilize at least one element of elastomeric material and are capable of replacing under certain conditions universal joints such as Cardan joints for instance. Said couplings have a number of advantages over the so-called universal joints: they are cheaper to produce, exhibit higher torsional flexibility and are inherently adapted due to the mechanical hysteresis and damping characteristics of the elastomers to take up cyclic irregularities in the rotational forces as well as overloads, jerks, vibrations, and noise. Further they require less maintenance and lubrication, and provide automatic compensation for wear. However, flexible couplings using elastomer elements as heretofore constructed, also have certain deficiencies over universal joints of the Cardan type; thus they usually permit of less misalignment between the shafts for a given rotational velocity, and are able merely to transmit less power for a given size of coupling and a given angular relation between the shafts. Further they tend to develop substantial heat due to the mechanical hysteresis of the elastomer especially at high rotational speeds so that the elastomer composition is apt to be short-lived. The composition is further subject to high internal stresses due to centrifugal forces at high speeds, which is another cause of distortion and damage. Many of such prior couplings were not fully homokinetic in character, meaning that rotation of one shaft at constant rate would induce in the other shaft a rotational velocity that was not strictly uniform over each revolution. This constitutes a serious drawback in many fields of use. A further defect has been a lack of radial rigidity in the coupling whereby the two shafts tended to wobble, that is, the point of intersection of the geometrical axes of the shafts would not remain strictly stationary in space during rotation of the shafts in constant angular relation. Substantial radial loads could not be transmitted between the shafts.

It is an object of this invention to provide an improved universal flexible coupling between rotatable shafts, which will combine many of the advantageous features of the universal joint type and elastomer type couplings as heretofore used while minimizing the deficiencies thereof. More specific objects are to provide a flexible coupling which will permit a high angular misalignment between the coupled shafts; will be simple, economical, compact and rugged; will be strictly homokinetic in operation; will embody elastomer material in relatively thin layers so as to minimize heat gradients and centrifugal strains in the mass of elastomer thereby increasing the service life of the coupling; will have high radial rigidity while providing substantial freedom between the coupled shafts both in angular misalignment thereof and/or in relative axial displacement therebetween; will operate smoothly and silently, and will permit transmission of high loads including provision for momentary overloads.

In accordance with one aspect of the invention, the improved universal flexible coupling between rotatable shafts comprises a hub member on one shaft, a cup member secured to the other shaft and surrounding the hub member in radially spaced relation therewith, a number of internested spirally wound strips of resilient material, e.g. metal, having their inner and outer ends respectively attached to said hub and cup members, and a substantially continuous mass filling the spiral spaces defined between the adjacent surfaces of the strips for resisting variations in the radial dimensions of said spaces.

The above and further objects, features and aspects of the invention will appear as the disclosure proceeds with reference to the accompanying drawings which illustrate some embodiments of the invention for purposes of illustration but not of limitation. In the drawings.

Figure 1:
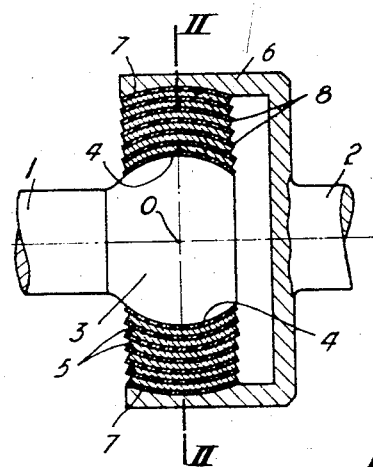
FIG. 1 is a side view, partly in diametric section, showing a coupling according to the invention in the aligned conditions of the shafts coupled thereby.
Figure 2:
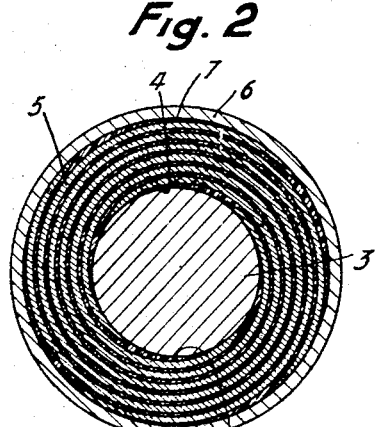
FIG. 2 is a cross section on line II—II of FIG. 1.
Figure 3:
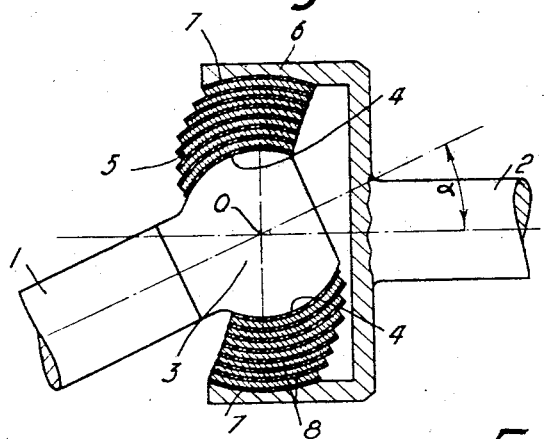
FIG. 3 is similar to FIG. 1 but with the shafts in disaligned or angular relation.

As shown in FIGS. 1 to 3, an improved coupling assembly serves to couple the pair of shafts 1 and 2, and comprises a hub member 3 formed on or connected to the end of the shaft 1 and having a generally spherical outer surface 4, with the centre of the sphere being positioned at O on the geometric axis of shaft 1.

Secured to the spherical surface in a manner to be described later, at points equally angularly spaced around the axis of shaft 1, are the inner ends of four similar strips 5 which may be formed from thin gauge steel stock having a transverse camber so that their transverse cross sections, as apparent from FIG. 1, are all concentric with the center of curvature O of the spherical surface. The four cambered strips 5 are wound in internested spirals around the axis of shaft 1, as will be apparent from FIG. 2, and between the facing surfaces of adjacent turns of the spiral strips there are provided thin layers 8 of a suitable solid lubricant or elastomer, e.g. cured natural or synthetic rubber composition, firmly bonded to the surface of at least one of the adjacent turns of steel strip. Such layers may be formed by spreading the rubber composition, by any suitable process such as dipping, spraying, or the like, over one of the two facing surfaces of each of the four strips 5, then suitably curing the composition in situ as by vulcanization, and winding the strips into the internested spirals shown. Alternatively the strips may first be wound into their spiral conformation and the assembly may then be dipped into a bath of rubber composition, and thereafter cured.

Formed or secured to the related end of the other shaft 2 is a sleeve or cup member 6 having a shallow annular recess 7 formed in its inner surface, the surface of the recess being in the form of a spherical annulus having the center O, and suitably dimensioned to receive the outer surface of the outermost turns of the strips 5 therein, said surface being attached to the surface of the cup or sleeve 6.

First considering the described assembly as it would be in the absence of the provision of elastomer 8 bonded between the turns of the strips 5, it will be clear that owing to the clearance present between the surfaces of said strips, the assembly will permit an angular relation (say by angle α) between the shafts 1 and 2, as illustrated in FIG. 3 with the adjacent turns of the strips 5 sliding or shifting with respect to one another in the manner depicted in that figure. Furthermore, should a torque T be applied to shaft 1 for example, the strips will be stressed in tension or in compression according as the torque applied to shaft 1 is in the same angular direction as, or is counter to, the sense of spiral winding of the strips; that is, referring to FIG. 2, the strips will be in tension if the torque is applied to shaft 1 counter-clockwise and will be compressed if the torque is clockwise. The tension or compression force will be transferred through the strips to the outer points of attachment thereof with the cup member 6, thereby transferring the drive torque to the driven shaft 2. It will be understood that since the steel strips 5 are positively contained between the cup 6 and the hub 3 they are able neither to wind or unwind, so that the stresses developed therein will be purely tensile or compressive stresses but will have no flexional component as would be the case with ordinary spiral hairsprings.

Assuming that the angle between the axes of the shafts is α as in FIG. 3, rotation of shaft 1 will rotate the shaft 2, in a manner generally similar to that of a universal joint, with the adjacent surfaces of the strips 5 shifting continually over one another to and fro, and it will be evident that in the absence of the intervening layers of elastomer or other lubricant 8, such relative shifting would result in objectionable wear. The provision of said elastomer or lubricant layers however reduces or eliminates such friction and permits free shifting between the adjacent steel surfaces with a minimum of passive resistance therebetween. Moreover the elatsomer or lubricant layers maintain a substantially uniform spacing between the turns of steel strip by taking up the pressures tending to apply said turns against one another, on application of a torque load to the coupling.

Figure 4:
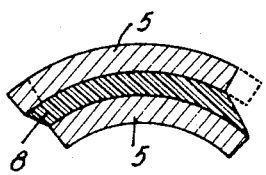
FIGS. 4 and 5 are explanatory diagrams serving to illustrate certain features of operation of the improved coupling.
Figure 5:
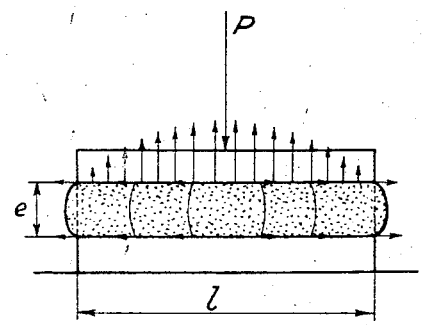

Considering the action of an elastomer layer 8 bonded to two facing surfaces of strip 5 in further detail, with reference to FIG. 4, it will be seen that the said facing surfaces will be able to shift with respect to each other along paths generally parallel to said surfaces, owing to the tangential elasticity of the elastomer. In the case of small relative displacements between the adjacent strip surfaces, a comparatively thin layer or film of elatsomer or lubricant therebetween will be satisfactory. Such small thickness ensures high resistance to crushing of the elastomer layer against the pressure applied thereto by the strips, and hence will impart a high torque-transmitting capacity to the coupling as well as the capacity of transferring high radial loads between the shafts. Referring to FIG. 5, it is known that when a layer of elastomeric material is compressed between a pair of parallel spaced plates (FIG. 5), the maximum load P it is able to take up in a direction normal to its surface depends on its inherent elastic strength and, in addition, on the ratio of its smaller dimension $l$ in the general plane of the layer over its thickness dimension $e$ normal to said plane, and the maximum permissible normal load P is substantially proportional, for a given elastomer composition and a given surface condition of the pressure plates, to the ratio $l/e$.

In working the invention the ratio $l/e$ as just defined is preferably selected within the range from 5/1 to 50/1, by suitably dimensioning the various components of the coupling and selecting the number of strips 5 as well as the number of turns of each strip. The number of strips 5 is preferably selected in the range from 4 to 8, and each strip should include at least one turn and preferably no more than three turns. The ratio of the inner diameter of cup 6 to outer diameter of hub 3 may desirably be selected in the range from 1.2 to 4 depending on the elasticity modulus and strength of the material from which said strips are made. The strips may comprise any suitable metal or alloy, etc. subjected to any appropriate heat and/or chemical treatment.

By way of indication, a satisfactorily operating coupling according to the invention and the following set of characteristics:

Radius of hub 3 _____ mm __ 25
Inner radius of cup 6 _____ mm __ 50
Radius ratio _____ 2
Number of strips 5 (steel) _____ 6
Thickness of strips 5 _____ mm __ 1
Width of strips 5 _____ mm __ 20
Thickness of elastomer layer 8 (rubber composition, Shore hardness 60) _____ mm __ 1
Ratio $l/e$ _____ 20

Figure 6:
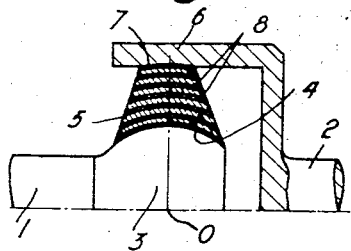
FIGS. 6 and 7 are views generally similar to FIG. 1 but each showing only one of the two symmetrical portions of the coupling and respectively relating to two modified forms of the invention.
Figure 7:
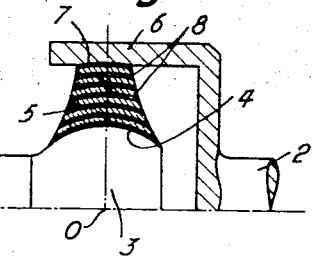

It is found that a more satisfactory distribution of stresses both in the metal strips and in the elastomer layers may be obtained by imparting to the said strips and intervening layers a gradually decreasing width dimension from the inner towards the outer ends thereof. Thus, in the modified construction shown in FIG. 6 said width dimension follows a linearly decreasing law. In the further modification shown in FIG. 7, the widths of the strips 5 are decreased according to a substantially exponential law. Both modifications shown in FIGS. 6 and 7 are otherwise quite similar to the first described embodiment and corresponding parts therein have been similarly designated as in FIG. 1. The width ratio between the inner and outer ends of the strips 5 in each of the constructions such as shown in FIGS. 6 and 7 may be in a range from 1.2/1 to 4/1 for example.

In addition to the lubricating action provided by the layers of elastomer or similar composition between the turns of steel strip, said layers provide several further advantages. One important advantage is the high radial rigidity imparted thereby to the coupling. That is, the spacing between adjacent strip surfaces as determined by the thickness $e$ of the intervening elastomer layer cannot substantially be modified except by exerting considerable radial force; in yet other words the apparent rigidity of the elastomer layers is very high along their thickness dimension. Such rigidity increases substantially in proportion to the square of the $l/e$ ratio.

As a result of this high radial rigidity of the coupling it is possible to impart a relatively high degree of pre-compression to the assembly including the steel strip spirals and elastomer by providing a relatively small difference in dimensions between the outer diameter of the spiral assembly and the inner diameter of the cup member 6, prior to insertion of the spiral assembly in the cup member during construction of the coupling. This pre-compression will increase the bond between the surfaces of the assembly and will positively prevent separation between the strips and elastomer layer regardless of the sense of the transmitted torque. Moreover, such pre-compression is well-known to improve the strength of elastomer compositions such as rubber and the like and their general resistance to strain, wear and tear, aging, chemicals and similar destructive agents. According therefore to a preferred feature of the invention, the composite spiral assembly including the metal strips and intervening elastomer layers is initially mounted under substantial pre-compression in the coupling. By way of example, and referring to the exemplary embodiment of the invention numerically specified above, with the dimensions given including the 1 mm. thick elastomer layer, the spiral assembly prior to insertion into the cup member 6 would have a radial dimension of 25.5 mm. whereas the radial clearance available between the periphery of hub 3 and the inner surface of cup 6 is only 25 mm.

The high radial rigidity of the elastomer layers positively prevents the ends of the steel strips from bending away from the adjacent surfaces of the hub or cup members. Such rigidity further enables the elastomer to withstand high centrifugal stresses as developed at high shaft rotation velocities without deformation, thus preserving the dynamic balancing of the system as initially provided. At the same time the relative centering between the hub and cup member, and hence the shaft extremities, is correctly maintained even under conditions of high-speed rotation, eliminating the necessity of providing mechanical centering means for the shafts as was generally required with flexible couplings in the past. The separate layers of elastomer composition further serve as an effective means of preventing transmission of vibrations between the shafts, so that the coupling is quite silent in operation. The spiral steel spring strips impart resiliency to the coupling in torsional and axial displacements, while the intervening elastomer layers impart a damping characteristic to such displacements. Thus the composite assembly exhibits an extremely desirable over-all characteristic. The transfer of vibrations therethrough is positively prevented both as regards the torsional and the axial modes.

Figure 8:
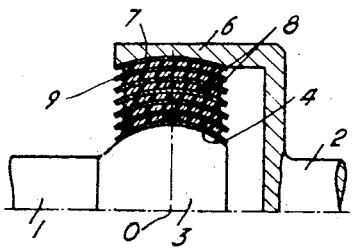
FIGS. 8 and 9 are similar views of further modifications.

While some heat may be generated in the body of elastomer due to dissipation of deformation energy by the inherent hysteresis of the elastomer, such amounts of heat will be readily dissipated in view of the very small thicknesses of the elastomer layers involved and the high heat conductivity of the intervening steel strips. In order further to enhance this heat dissipating action, the construction shown in FIG. 8 may be used, wherein the layers of elastomer are substantially narrower in width than the width of the steel strips 5, thereby defining projecting marginal fins 9 serving to increase the cooling surface and creating an additional cooling effect due to the fanning action of such fins 9 during rotation of the coupling.

The inner and outer terminal sections of the steel strips 5 near their points of attachment to the surfaces of hub 3 and cup 6 respectively are subjected to reciprocating strains during the rotation of the coupling. Such strains however are minimized owing to the extremely gradual transition from the areas of attachment of the strips at their ends to the relatively free areas of the strips within the body of the coupling, such gradual transmission being a further advantageous consequence of the small thickness dimension imparted to the elastomer layers of the invention.

Figure 9:
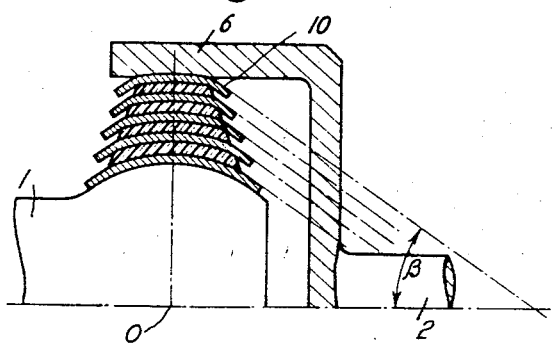

It will be understood from the foregoing description with reference especially to FIG. 1 that in view of the inherent geometry of the novel coupling that the transverse curvature of the steel strips as seen for example in FIG. 1 must gradually increase (i.e. the radius of curvature must decrease) in the radially inward direction, since all the successive arcuate segments have a common center of curvature at the centre O of hub 3. The strips 5 must therefore be suitably shaped prior to assembly to impart the requisite gradual variation in curvature to them. This shaping action can be effected by any suitable means as by exposing the initially flat steel strip stock to hot or cold pressing operations, or winding on a suitably shaped core, or shaping by rollers or otherwise. The said transverse curvature in addition to permitting an angular misalignment between the coupling shafts in accordance with the main feature of the invention, has a further advantage in that it prevents local buckling actions as would tend to occur when the steel strips are stressed in compression. The transverse curvature serves to stiffen and thereby stabilize the strips against such buckling. This stabilizing action may be increased by bending somewhat the marginal edges of the strips as shown in FIG. 9 so that all said edges shall form equal angles, as indicated at β, to the axis of the coupling. It will be evident that in order to achieve such constant angle β to the axis, the innermost turns of strip should not substantially be bent from their natural arcuate shape and the degree of bending imparted thereto should progressively increase in the radially outward direction as will be clear from FIG. 9. The angle β may have any suitable value say within a range from 15° to 30°. The constant marginal angle will facilitate the moulding of the elastomer and will not interfere with the angular displacements of the coupling provided the bent marginal portions 10 are free of elastomer as shown in FIG. 9. Thus it is seen that the construction shown in FIG. 9 simultaneously embodies the feature described above with reference to FIG. 8, that is, the bent marginal portions 10 serve the function of the heat dissipating projections or fins 9 of FIG. 8.

In assembling the composite spiral structure described, the spiral stool strips are preferably inserted in sequence, while rotating the hub 3 by means of a suitable jig in the proper angular direction to wind up the strips, the inner end of each strip being bonded in turn to the surface of the hub. The assembly may then be placed in an elastomer molding assembly which may be provided with means for maintaining the edges of all the strips in accurately defined positions so as to impart the desired uniform spacing between the turns of steel strip.

Figure 11:
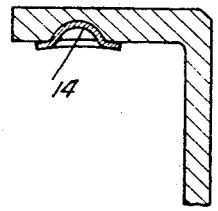
FIG. 11 is a section on line XI—XI of FIG. 10.
Figure 10:
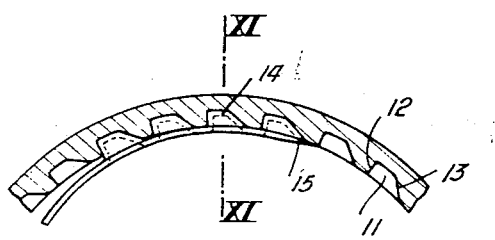
FIG. 10 is a partial cross sectional view, on a large scale showing the outer cup member of a coupling according to the invention and illustrating the means of attachment between a metal strip and the inner surface of the cup member.
Figure 12:
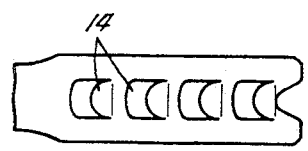
FIG. 12 is a front elevational view of the end part of a metal strip formed for the purpose of providing attaching means of the type shown in FIGS. 10 and 11.

The bond between the ends of the strips and the surfaces of the hub and cup may assume any of various forms, e.g. continuous or spot welds, rivets, bolts, or tongue-and-slot joints etc. One desirable form of attachment is illustrated in FIGS. 10 to 12 which depict the attachment of the outer ends of the strips to the cup 6, though it will be understood that generally similar means may be used for the attachment of the inner ends to the hub.

The inner cup surface which may include the annular recess 7 described with reference to FIG. 1, is internally formed with a series of sockets or recesses 11 which preferably have a disymmetrical longitudinal profile as shown, each socket including at one side a substantially radially extending wall 12 at that side of it on which tension is applied to the strips, while the opposite wall 13 is inclined at a slope of say from 45° to 75° to the related radius. Correspondingly shaped bosses or lugs 14 stamped out of the surfaces of the strips 5 over an arc extending from the outer end of each strip engage the sockets as shown in FIG. 10. The resulting means of attachment may be quickly, easily yet accurately produced. Interengagement between the lugs and sockets will occur of its own accord as the spirally wound strips, coated with elastomer and preliminarily inserted in position around the hub, are inserted under pre-compressed bias into the hub 6, by means of any suitable jig press which may include a funnel-like guide structure for facilitating insertion as will readily appear to those familiar with the art. The presence of the bosses or lugs 14 does not reduce the thicknes of elastomer between the turns of strip so that the elastomer retains its full action and the freedom of motion of the spiral is not impaired. Such means of attachment, furthermore, is strong and robust in that the drive force is distributed over a substantial arc of the circumference; the loads are progressively transferred from the strips to the cup member; and the accurately homokinetic character of the coupling is preserved since the loads are transferred from the strips to the full periphery of the hub. Moreover the attachment is relatively flexible, permitting occurence of slight translational or rotational displacements in case of extremely high instantaneous loads, thereby reducing local strains, whereas under normal loads the attachment retains full rigidity. Moreover this type of attachment does not necessitate any special treatment of the surfaces involved since the surface conditions are not critical. Due to the gradual insertion of the bosses 14 into the sockets 13 the strains developed in the strips are minimized. Further to enhance such progressivity the tip of each strip may be thinned down as at 15 (FIG. 10). Owing to the radial direction of one side 12 of the bosses and sockets, tension stresses are transferred from the strips to the cup member without any radial centripetal (i.e. inward) component, which if present would tend to disengage the bosses from their sockets, whereas the sloping direction of the opposite sides 13 facilitates insertion. The transfer of compressive forces from the cup to the strips by way of the sloping sides 13 generates radial inward force components that will at no time exceed the radial outward forces tending to spread out the spirally wound strip, thus precluding any risk of disengagement of the bosses out of their sockets.

As mentioned the inner ends may be connected with the hub 3 in a similar manner. The boses would of course in this case be directed inwardly. Moreover, the profile of the bosses and the sockets in the hub cooperating therewith would be reversed from that described with respect to the outer attaching arrangement, that is, the radial wall would be positioned on that side against which compression forces would be exerted in operation. In this way when the strips are stressed in tension they tend to embrace the hub more firmly, positively resisting disengagement. In either case the number and spacing of cooperating bosses and sockets at each end of the strips may be varied but should preferably be as large as permitted by the arcuate extent of the hub or cup section allotted to each strip.

Figure 13:
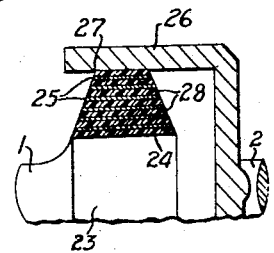

Many departures may be made from the specific forms of embodiment described and illustrated without exceeding the scope of the invention. Thus, while the spiral strips are preferably transversely cambered so to provide arcs of circumference having the same centre O as the spherical hub 3, in order to permit maximum angular misalignment between the shafts, satisfactory results may in many cases be achieved by imparting different transverse curvatures to the spiral strips, e.g. with a longer radius including an infinite radius i.e. transversely flat strips. As shown in FIG. 13 in which 23 is the hub member connected to the end of shaft 1, and having a cylindrical outer surface 24, 26 is the cup member connected to shaft 2 and having a cylindrical inner surface 27, reference numeral 25 denoting the four spirally wound, internested, transversely flat metal strips with the elastomer or lubricant layers 28 arranged therebetween. This, while reducing the range of angular displacements of which the coupling will be capable, will increase the range of relative axial displacements the shafts can assume. Preferably the strip thickness would then be made greater or higher-tensile strip material would then be employed. In all events however the thickness of the elastomer layers should be kept to a minimum for optimum operation of the coupling.

In the construction, just mentioned, where the strips 5 are free of transverse camber, i.e. are transversely flat, the hub member 3 may of course be substantially cylindrical rather than spherical as shown.

Another modified construction contemplated by the invention is to provide the surface of hub 3 (and preferably the inner surface of cup 6) in the form of a plurality of small flat areas all tangential to a common sphere having the centre O. The strips 5 would then of course be provided with a corresponding cross-sectional configuration.

While natural or synthetic elastomer compositions are advantageously used to constitute the spiral layers between the strips, various other solid substances having suitable lubricant properties may be used, including graphite, molybdenum disulfide, polytetrafluoroethylene (Teflon), and the like. Relatively fluid lubricants may likewise be used as the filling mass, in which case a sealed casing may be provided around the coupling of the invention, e.g. by suitably extending the surrounding cup member 6.

What I claim is:

1. A universal flexible coupling between two shafts, comprising a hub member on one shaft and a cup member on the other shaft; a plurality of internested spirally-wound metallic strips of resiliently-flexible material having their inner and outer ends attached to the outer and inner peripheries of said hub and cup members respectively, at spaced points around said peripheries and defining internested spiral spaces between adjacent faces of said strips, the number of said strips, the number of spirals of each strip and the ratio of the external diameter of said hub member to the internal diameter of said cup member being such that the radial distance between any two adjacent strips is less than one-fifth of the width of said strips; and a mass of substantially yielding nonmetallic material filling said spiral spaces.

2. A universal flexible coupling between two shafts comprising a hub member on one shaft and a cup member on the other shaft, a number of internested spirally wound strips of resiliently flexible material having their inner and outer ends attached to the outer and inner peripheries of said hub and cup members respectively at spaced points around said peripheries and defining internested spiral spaces between adjacent surfaces of said strips, the number of said strips, the number of spirals of each strip and the ratio of the external diameter of said hub member to the internal diameter of said cup member being such that the radial distance between any two adjacent strips is less than one-fifth of the width of said strips, and a mass of yielding elastomer material filling said spaces.

3. A universal flexible coupling between two shafts comprising a hub member on one shaft and a cup member on the other shaft, a number of internested spirally wound strips of resiliently flexible material having their inner and outer ends attached to the outer and inner peripheries of said hub and cup members respectively at spaced points around said peripheries and defining internested spiral spaces between adjacent surfaces of said strips, the number of said strips, the number of spirals of each strip and the ratio of the external diameter of said hub member to the internal diameter of said cup member being such that the radial distance between any two adjacent strips is less than one-fifth of the width of said strips, and a mass of lubricant material filling said spaces.

4. The coupling claimed in claim 3 wherein said lubricant material comprises graphite.

5. The coupling claimed in claim 3 wherein said lubricant material comprises polytetrafluorethylene.

6. The coupling claimed in claim 3 wherein said lubricant material comprises molybdenum disulfide.

7. A flexible coupling between two rotatable shafts comprising a hub member on one shaft, a cuplike member on the other shaft surrounding and radially spaced from said hub member, a number of internested spirally wound metal strips having their inner and outer ends attached to said hub and cup members respectively and inserted between said members in a state of pre-compressed bias and defining internested spiral spaces between adjacent faces of said strips, the number of said strips, the number of spirals of each strip and the ratio of the external diameter of said hub member to the internal diameter of said cup member being such that the radial distance between any two adjacent strips is less than one-fifth of the width of said strips, and a mass of yielding material filling the spiral spaces defined between adjacent strip surfaces.

8. A flexible coupling between two rotatable shafts comprising a generally spherical hub on one shaft, a member secured to the other shaft and including an annular surface surrounding and radially spaced from the surface of said hub, a number of internested spirally wound strips of flexibly resilient material having their inner and outer ends attached to the surfaces of said hub and said member respectively, said strips having transverse curvatures such that the successive turns of said spirals all have contours substantially concentric with said spherical hub as seen in planes extending through the axes of the shafts and defining internested spiral spaces between adjacent faces of said strips, the number of said strips, the number of spirals of each strip and the ratio of the external diameter of said hub member to the internal diameter of said cup member being such that the radial distance between any two adjacent strips is less than one-fifth of the width of said strips, and a mass of yielding material filling said spiral spaces so as to permit relative movement between adjacent surfaces of said strips during rotation of the shafts in an angular relation, while substantially preventing variations in radial dimensions of said spiral spaces.

9. A flexible coupling between rotatable shafts comprising a hub member on one shaft, a cup member on the other shaft surrounding and radially spaced from said hub member, a number of internested spirally wound strips of flexibly resilient material having their inner and outer ends attached to said hub and cup members respectively and defining internested spiral spaces between adjacent faces of said strips, the number of said strips, the number of spirals of each strip and the ratio of the external diameter of said hub member to the internal diameter of said cup member being such that the radial distance between any two adjacent strips is less than one-fifth of the width of said strips, and a mass of yielding material filling said spiral spaces so as to resist variations in the radial dimensions of said spaces.

10. The coupling claimed in claim 9, wherein said hub and cup members have cylindrical surfaces coaxial with the respectively related shafts and said strips are generally flat in cross sectional configuration.

11. The coupling claimed in claim 9, wherein at least said hub member has a part-spherical surface coaxial with the related shaft and said strips are cambered in cross sectional configuration concentrically with said hub member.

12. A flexible coupling between rotatable shafts comprising a generally spherical hub on one shaft, a part secured to the other shaft and defining an inner annular surface surrounding and radially spaced from the hub surface, a number of internested spirally wound metallic strips having their inner and outer ends attached to the surfaces of said hub and part respectively in angularly spaced relation therearound, each turn of each spirally wound strip benig cambered substantially concentrically with the spherical hub as seen on a diametric plane of said hub normal to the general plane of said spirally wound strips, said spirally wound strips being inserted between said surfaces of the hub and part in a state of substantial radial precompression and a yielding mass filling the spaces between said strips so as to permit relative shifting between adjacent surfaces thereof during rotation of the shafts in angled condition while substantially resisting variations in radial dimension of said spaces.

13. The coupling claimed in claim 9, wherein at least said hub member has a part-spherical surface concentric with the related shaft and said strips have a cross-sectional configuration including a cambered major intermediate portion concentric with said hub member and projecting side portions parallel as between respective turns of said strips, and said mass fills the spaces defined between said cambered intermediate portions of the strip surfaces while said parallel side portions are free of said mass.

14. The coupling claimed in claim 9, wherein the means of attachment between said strips and said members comprise a number of recesses in the surfaces of said members and cooperating bosses stamped from said strips for engagement with said recesses.

15. The coupling claimed in claim 9, wherein said strips have a width dimension tapering gradually down from their inner to their outer ends.

References Cited in the file of this patent
UNITED STATES PATENTS

| | | |
|---|---|---|
| 1,868,818 | Eksergian | July 26, 1932 |
| 2,158,028 | Burke | May 9, 1939 |
| 2,176,971 | Klotsch | Oct. 24, 1939 |
| 2,760,359 | Wildhaber | Aug. 28, 1956 |